United States Patent
McKelvey et al.

(10) Patent No.: US 8,542,126 B2
(45) Date of Patent: *Sep. 24, 2013

(54) OPTICAL NETWORK TERMINAL BACKUP BATTERY CENTRALIZED MONITORING AND VOLTAGE ALERT

(75) Inventors: Henry A. McKelvey, Capitol Heights, MD (US); Randy B. McCain, Jr., Fort Washington, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 664 days.

This patent is subject to a terminal disclaimer.

(21) Appl. No.: 11/930,356

(22) Filed: Oct. 31, 2007

(65) Prior Publication Data

US 2009/0052889 A1  Feb. 26, 2009

Related U.S. Application Data

(63) Continuation-in-part of application No. 11/842,306, filed on Aug. 21, 2007.

(51) Int. Cl.
 *G08B 21/00* (2006.01)
(52) U.S. Cl.
 USPC .............. 340/636.1; 340/636.15; 398/17
(58) Field of Classification Search
 USPC ............. 340/636.1, 635, 636.12, 636.16, 340/636.19; 398/70, 17
 See application file for complete search history.

(56) References Cited

U.S. PATENT DOCUMENTS

| | | | | |
|---|---|---|---|---|
| 5,150,243 A | * | 9/1992 | Suzuki | 398/17 |
| 5,231,565 A | * | 7/1993 | Bilas et al. | 700/22 |
| 5,319,298 A | | 6/1994 | Wanzong et al. | |
| 5,343,135 A | | 8/1994 | Mathieson | |
| 5,523,868 A | * | 6/1996 | Hawley | 398/38 |
| 5,808,767 A | * | 9/1998 | Williams et al. | 398/70 |
| 5,895,440 A | | 4/1999 | Proctor et al. | |
| 5,907,491 A | | 5/1999 | Canada et al. | |
| 6,028,916 A | * | 2/2000 | Beveridge | 379/56.2 |
| 6,031,354 A | | 2/2000 | Wiley et al. | |
| 6,061,639 A | | 5/2000 | Wistrand | |
| 6,072,984 A | * | 6/2000 | Barringer | 725/107 |
| 6,078,649 A | * | 6/2000 | Small et al. | 379/39 |
| 6,089,456 A | * | 7/2000 | Walsh et al. | 235/472.01 |
| 6,154,033 A | | 11/2000 | Palanisamy et al. | |
| 6,240,337 B1 | * | 5/2001 | Marr et al. | 700/286 |
| 6,288,806 B1 | * | 9/2001 | Touma et al. | 398/5 |
| 6,459,896 B1 | * | 10/2002 | Liebenow | 455/425 |

(Continued)

*Primary Examiner* — Jennifer Mehmood
*Assistant Examiner* — Rufus Point (57) ABSTRACT

An optical network terminal (ONT) battery backup unit (BBU) battery voltage alert system (BVAS). This alert is provided as a supplement to an audio alarm which sounds when the backup battery is discharging because that alarm may not be heard in sufficient time if the alarm is remotely located relative to its customer, e.g., in the customer's basement or outside. A battery monitoring facility, located in a telecommunication service provider's centralized serving office, or remotely located elsewhere, monitors the voltage of each of a plurality of batteries deployed in customers' premises within the geographical area served by that centralized serving office. That battery monitoring facility receives packets via a communication network from each such customer's premises, each of those packets representing a battery voltage measurement. That battery monitoring facility stores these on-going measurements thereby creating a trending database to point to any potential future battery failures. The battery monitoring facility alerts a particular customer via the communication network when its battery is about to fail by email/text, fax, telephone or other similar mechanism.

22 Claims, 5 Drawing Sheets

(56) References Cited

U.S. PATENT DOCUMENTS

| | | | | |
|---|---|---|---|---|
| 6,466,138 B1* | 10/2002 | Partyka | | 340/870.11 |
| 6,564,051 B2* | 5/2003 | Struhsaker et al. | | 455/423 |
| 6,731,223 B1* | 5/2004 | Partyka | | 340/870.15 |
| 6,803,745 B2* | 10/2004 | Nishida et al. | | 320/112 |
| 6,804,789 B2 | 10/2004 | Shimizu | | |
| 6,829,478 B1* | 12/2004 | Layton et al. | | 455/428 |
| 6,885,307 B2* | 4/2005 | Lockhart et al. | | 340/636.15 |
| 6,956,488 B2 | 10/2005 | Hasegawa | | |
| 7,116,761 B2* | 10/2006 | Ashton et al. | | 379/56.2 |
| 7,277,637 B2* | 10/2007 | Jette et al. | | 398/70 |
| 7,406,623 B2 | 7/2008 | Takahashi et al. | | |
| 7,412,169 B2* | 8/2008 | Joo et al. | | 398/72 |
| 7,474,228 B2 | 1/2009 | Lockhart et al. | | |
| 7,652,390 B2* | 1/2010 | Vrla et al. | | 307/1 |
| 7,751,711 B2* | 7/2010 | Wynman | | 398/72 |
| 7,995,920 B2* | 8/2011 | Wynman | | 398/72 |
| 2001/0048364 A1 | 12/2001 | Kalthoff et al. | | |
| 2003/0105601 A1* | 6/2003 | Kobayashi et al. | | 702/63 |
| 2004/0135696 A1 | 7/2004 | Hasegawa | | |
| 2005/0071093 A1 | 3/2005 | Stefan | | |
| 2006/0017581 A1 | 1/2006 | Schwendinger et al. | | |
| 2006/0187071 A1 | 8/2006 | Kortum et al. | | |
| 2008/0025721 A1 | 1/2008 | Wynman | | |
| 2008/0195881 A1 | 8/2008 | Bernard et al. | | |
| 2008/0240367 A1* | 10/2008 | Wynman | | 379/2 |
| 2008/0247760 A1 | 10/2008 | Edmon et al. | | |
| 2009/0015204 A1 | 1/2009 | Rosenwald et al. | | |
| 2009/0015417 A1* | 1/2009 | Bernard et al. | | 340/636.1 |
| 2009/0016721 A1* | 1/2009 | Wurst et al. | | 398/67 |
| 2009/0022306 A1 | 1/2009 | Wang et al. | | |

\* cited by examiner

OPTICAL NETWORK TERMINAL BACKUP BATTERY CENTRALIZED MONITORING AND VOLTAGE ALERT

CROSS-REFERENCING OF RELATED APPLICATIONS

This patent application is a continuation-in-part (CIP) application, filed under 37 C.F.R. §1.53(b)(2), of prior non-provisional parent application Ser. No. 11/842,306, filed on Aug. 21, 2007, and entitled: "Optical Network Terminal Backup Battery Voltage Alert." This patent application has the same inventors as those in the parent application, and has its assignee in common with that of the parent application. Benefits under Title 35 United States Code section 120 (35 U.S.C. §120) are hereby claimed.

BACKGROUND

Fiber optic infrastructure is currently being deployed by the assignee of the present invention with its fiber-optic system program, and is being operatively connected to its customer base. Fiber optic telecommunication infrastructure offers many advantages over the old standard copper wire cabling, not the least of which is vastly increased bandwidth. "Plain old telephone service" (POTS) had operated, and still operates, with copper wiring. POTS is now being made compatible with fiber optic cabling, such as in passive optical networks (PONs).

However, providing POTS service in combination with this new PON fiber optic infrastructure involves certain optically-related and/or other functionality not previously needed in the copper wire cabling world. For example, an optical line terminal (OLT) is needed which may be located in the central office of the relevant telecommunications company or at some other regional location (but not on customer premises). The OLT is communicatively coupled via fiber optic cable to an optical network terminal (ONT) which can be located immediately outside of a customer's premises on an outside wall some four to five feet above ground, or can be located inside a customer's premises such as in a basement.

The ONT includes and is powered by a power supply such as, for example, a power supply similar, or related, to that described in patent application Ser. No. 11/144,566 filed Jun. 3, 2005, and incorporated herein by reference in its entirety. That patent application is entitled "Multi-Component ONT Power Supply" and its assignee is in common with that of the instant application. That patent application claims benefit of provisional application Ser. No. 60/576,675 filed Jun. 3, 2004. That power supply is, in turn, powered by typical electric utility company power which is subject to power failure for any number of reasons including, for example, power company equipment failure, local or national emergencies, natural disasters, terrorist attacks, etc.

During a utility company power failure, battery backup is needed. Traditional POTS telephone service over copper wiring is ordinarily able to continue because of POTS battery back-up infrastructure which is in place at telecommunication company central offices. This battery backup system is designed to maintain POTS telephone service for an entire community. But, that otherwise—available POTS telephone service will not be available to a telephone customer using a PON system, if the ONT cannot communicate with the OLT over the fiber optic cable because the ONT lacks power due to that power failure.

To this end, battery backup has also been provided within the ONT and within the environment for the ONT, and for customer telephone instruments connected to that ONT. But, in contrast with the central office location of POTS battery backup, ONT battery backup is located proximate its associated ONT. This ONT battery backup unit (BBU) can be designed to include certain customer—useful features. One such feature is an audio alarm which sounds when the backup battery voltage level is low. For example, application Ser. No. 11/460,499, filed Jul. 27, 2006, entitled: "Optical Network Terminal Power Failure Management" relates to managing a low ONT battery voltage audio alarm; this application is assigned to the assignee of the instant application and is incorporated herein by reference in its entirety.

However, a sounding-alarm, if battery voltage is low due to utility company power failure, or for other reasons, is not always heard by the customer in sufficient time for the customer to take appropriate action, particularly if the ONT is installed in a relatively remote place on the customer's premises, such as outside of the house or in the basement. Under certain conditions, such an alarm can be sounded for several hours and never be heard by occupants of the customer's premises. The backup battery can be discharged completely during that critical time period. If the backup battery is completely discharged and, on the one hand, if that battery discharge was due to a utility company power failure, then communication services via the ONT would be completely unavailable unless and until power is restored by the power company. On the other hand, if battery discharge was due to other reasons, the battery is then useless if needed for backup purposes if and when there is a utility company power failure.

In connection with this battery discharge problem, there is a need to obtain and maintain data on the state of the battery in an ongoing manner. It would be useful to know how the voltage level of a battery is trending over a period of time to enable predictions about future failure of that battery. It would be even more useful if this information could be obtained and maintained on each one of a large number of batteries deployed, respectively, at a like number customer premises, where such data obtained over a large population of batteries can offer valuable and on-going statistical insight to battery performance and failure as a function of many variables such as, e.g., battery manufacturer, battery model, battery chemistry, and battery placement (internal/external) at the customer premises.

DETAILED DESCRIPTION OF PREFERRED EMBODIMENTS

When a backup battery for an ONT is discharging because it is backing-up the ONT during a utility company power outage, or has a voltage level less than full voltage due to a failed battery cell or for any other reason, an audio alarm is normally sounded. If that audio alarm cannot be heard, where the battery may run down completely without warning to the customer, embodiments of the present invention provide multiple alerts to the customer via email, pager, land-line telephone, wireless telephone, fax, PDA and any other available telecommunication connection. These alerts, or a subset of them, can also be forwarded to the supplier of the ONT, and even to a third party monitoring service.

Figure 1:
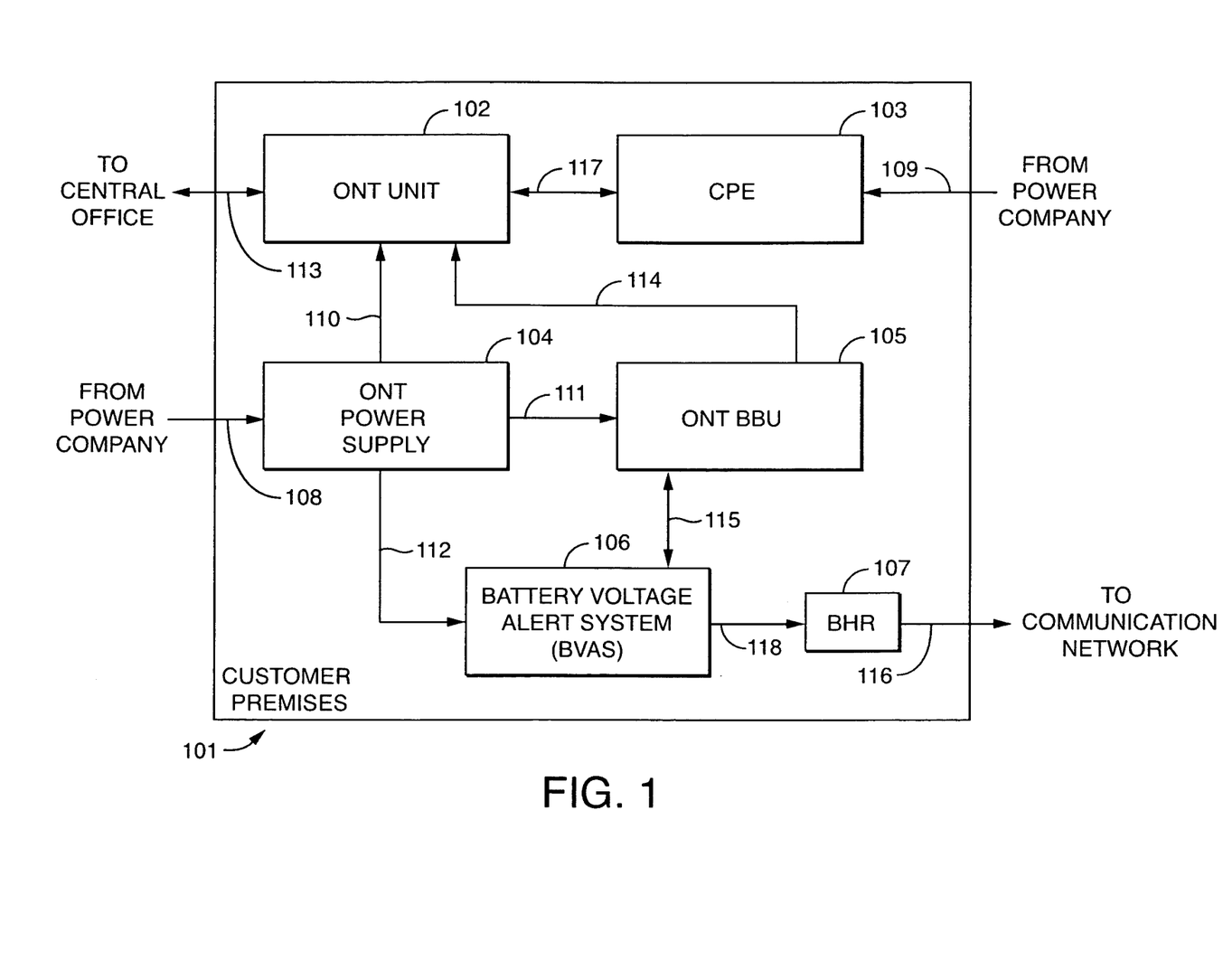
FIG. 1 is an exemplary block diagram of an ONT arrangement in a customer premises environment with which embodiments made in accordance with principles of the present invention are particularly useful.

FIG. 1 is an exemplary block diagram of an ONT relationship with customer premises equipment (CPE) in a customer premises environment, with which embodiments of the present invention are particularly useful. Customer premises 101 may be, for example, a single family house and includes: customer premises equipment (CPE) 103, ONT unit 102, ONT power supply 104, ONT battery backup unit (BBU) 105, battery voltage alert system (BVAS) 106 and broadband home router (BHR) 107. CPE 103 includes, without limitation, e.g., telephone, television, computer, fax machine, etc., not shown.

Power from a utility company is supplied to premises 101 via power lines 108 at the left-hand side of the drawing and 109 at the right-hand side of the drawing. Power line 109 powers all CPE 103 (including appliances, etc., not shown). Power line 108 supplies power to ONT power supply 104 which, in turn, supplies power to ONT unit 102, ONT BBU 105 and BVAS 106 via power lines 110, 111 and 112 respectively. ONT UNIT 102 is operatively coupled to CPE 103 via bus 117 (which represents both a bidirectional communication bus and a power connection to CPE 103 from ONT BBU 105 via power bus 114 and ONT UNIT 102 during power failure). ONT BBU 105 is operatively coupled to ONT unit 102 via power bus 114 during power outages, to supply power to ONT unit 102 during power outages.

ONT BBU 105 is also operatively coupled to BVAS 106 via bus 115 (which represents a bidirectional communication bus and a power connection from ONT BBU 105 to BVAS 106 during power failure). Alerts from BVAS are coupled to BHR 107 via output link 118. BHR 107 outputs the alerts to a communication network on line 116. Communication input to, and communication output from, ONT UNIT 102 is provided over optical fiber line 113 which is connected to an OLT in a central office of a telecommunication company that supplied the ONT arrangement to the customer. Operation of certain of the equipment in FIG. 1 is further discussed in the incorporated by reference patent, application entitled: "Optical Network Terminal Power Failure Management."

Under normal conditions of no power outage at the power company, power supply 104 powers not only the ONT unit 102, but also continuously charges a battery (not shown in this Fig.) located within ONT BBU 105 in an attempt to keep it fully charged for backup purposes, in the event of a power outage and also powers BVAS 106 which monitors battery voltage. Under these normal operating conditions, communication information can be received on bus 113 via an optical fiber cable from the central office of the telecommunications company. That information is processed in ONT unit 102, and forwarded to the appropriate customer equipment (phone, fax, TV, etc.) over bus 117. After the customer receives such information, e.g., a message from a calling party in a telephone call, then the customer speaks a reply which likewise provides a signal from CPE 103 via bus 117 to ONT unit 102 where it gets further processed before it gets forwarded via fiber optic line 113 to the central office and, thereafter, to its ultimate destination which in this example is the calling party.

Figure 2:
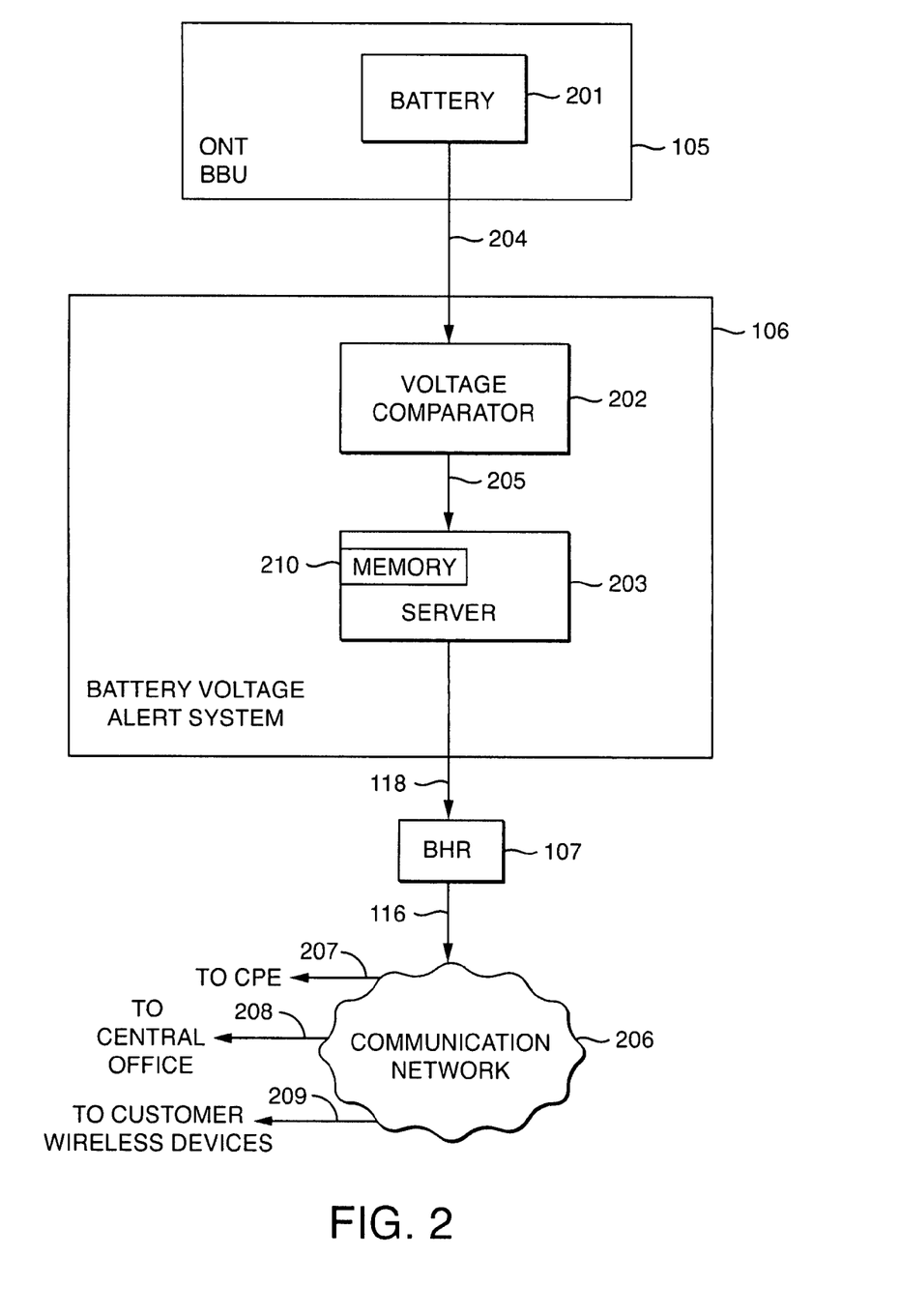
FIG. 2 is an exemplary block diagram of a BBU battery voltage alert system in operative connection in a network context, in accordance with principles of the present invention.

FIG. 2 is an exemplary block diagram of an ONT BBU battery voltage alert system (BVAS) 106 in operative connection in a network context, and in accordance with principles of the present invention. To enhance the presentation, rather than repeat ONT BBU BVAS, only BVAS shall be used as an equivalent designation hereinbelow. BVAS 106 is connected from ONT BBU 105 via battery voltage sampling lines 204 (these lines being included within bus 115 of FIG. 1) and is connected to BHR 107 via output alert signal line 118, also as shown in FIG. 1. BHR 107 is connected via link 116 to network 206, which may include any number of individual networks, local or wide-area, public or private (e.g., a LAN, the Internet), also as shown in FIG. 1. Alert signals are sent from server 203 via BHR 107 and network 206 to CPE 103 (phone, fax, email, etc.) via network link 207, to the central office of the telecommunication company supplier and/or to a third party dedicated to battery monitoring on a regional or national scale via network link 208, and to customer wireless devices (wireless telephone, blackberry, etc.) via network link 209. These alert signals are sent to various notification addresses. Server memory 210 can store a listing of these notification addresses which can be added to the server by the customer by way of an HTML interlace. The customer would have access to this interface to allow the customer to set up its contact information and email addresses. The information and addresses could be stored in a flat file list and readily accessed when a notification is required by the server.

BHR 107 is a router and, in the preferred embodiment, typically can be model M1424WR by Actiontec or the equivalent. Alert signal line 118 can typically be a Category 5 copper Ethernet line using HTTP, POP, IMAP, TCP or UDP, and IP protocol. Network link 116 can typically include an Ethernet link carried over Category 5 copper line or a coaxial cable from BHR 107 and then converted into Gigabit Ethernet (GigE) over fiber optic cable using TCP/IP over GigE protocol, as is well known. Each of network links 207, 208 and 209 can typically include a Category 5 copper line or fiber optic cable using SONET (e.g., OC3, OC12, OC48), ATM, GigE, or MPLS protocols, as is well known. Other suitable lines, cables and protocols can be used in implementing links. ONT BBU 105 includes battery 201 which may typically be a rechargeable lead acid or lithium battery.

BVAS 106 includes voltage comparator 202 and server computer 203. Voltage comparator 202 can be a conventional device that measures DC voltage between limits of zero (or negative) volts to at least positive twelve volts in an analog format and which converts those analog measurements to corresponding digital values. Typically, sampling of the analog measurement is made and those readings are then converted to digital equivalent values within voltage comparator 202 and which are then stored, or logged, in memory 210 within server computer 203. In the preferred embodiment, only readings of battery voltages which are less than the fully-charged battery voltage are logged. For example, if a fully charged battery in a particular embodiment is twelve volts, then any and ail twelve volt readings are not recorded and logged. Normally, battery 201 remains fully charged for long periods of time, and storing/logging normal readings would be a waste of memory space. Thus, in the preferred embodiment, only readings reflecting any discharge of the battery from its fully charged status are logged.

However, if it were determined that maintenance of ail voltage readings was desirable for statistical analysis or other reasons, then all actual voltage measurements could be stored at the time they were made if appropriate accommodation for storage of this additional information was taken into account. To conserve memory space, log storage can be accomplished in a manner which allows logs to be kept to a specific size. When the logs reach that size limit they may be transferred to a log storage space, e.g., on a network drive, for future reference. Alternatively, one could limit memory usage so that the older stored voltage measurements would fell off the log (log pruning) as new voltage measurements were written into memory. Log pruning shall ultimately result in loss of data, as compared with transferring the logs to a log storage space, but may be sufficient for certain usages of that data.

If battery 201 outputs less than full battery voltage, either due to discharging because of its being used in a backup capacity during utility company power failure, or because a cell of the battery fails regardless of the utility company's power status, or for any other reason, that battery output voltage is digitized in ONT BBU 105 and stored in memory 210. That battery output voltage is thereafter processed in server 203 into appropriate alert signals for routing via BHR 107 and network 206 to the customer and/or to the central office of the ONT supplier or battery service provider.

Server 203 can be based upon a miniature Linux kernel, also known as the "Busy Box" or DSL ("damn small Linux") kernel. This server allows email functionality and http server functionality which are used to alert the customer to adverse battery conditions, if any. The server also acts as a logging mechanism to store information about the battery's condition, derived from scheduled battery checks. The battery voltage checks, or samples, are initiated by a scheduler implemented under Linux—in the preferred embodiment, the "cron" scheduler is used. Linux server 203 can be "Linux on a chip" and can be positioned internally to BBU 105, or can be a miniature Linux server located outside of BBU 105. It should be understood that other server configurations could be used and Linux is only one possible embodiment.

Linux server 203 can also contain scripts to control hardware in voltage comparator 202 that performs the battery voltage checks, and controls the processes that utilize stored data based on those checks. The data can be stored in a local database (on the customer site in, e.g., memory 210) or offsite (in remote storage). Remote storage permits the usage of a remote monitoring company dedicated to the monitoring of installed back-up batteries throughout a fiber-to-the-premises (FTTP) regional, or even national, area. Storage of this data allows maintenance of records related to voltage condition of battery 201 and to the number of low voltage events that may have occurred over a long period of time with respect to each installed battery. The miniature Linux kernel in server 203 also allows USB port, serial port and Ethernet port functionality.

Server 203 can use as its memory 210 a combination of non-volatile and volatile memory, as is well known. For example, in the preferred embodiment, a 2 GByte USB Flash drive may be used as a non-volatile "hard drive" and a 128 MByte SRAM memory chip as its volatile system memory, allowing it to run the basic Busy Box Linux kernel with the aforementioned scripts needed to provide required processes for voltage comparison and monitoring. The HTTP server functionality and serial port functionality allow for connectivity to a monitoring circuit such as voltage comparator 202. The serial connection can use an internal or external cable 205 to connect voltage comparator 202 to Linux server 203. USB is useful primarily for point-to-point communications, if there is need for connectivity to a personal computer (PC). (A PC would connect to server 203 via the USB port to enable a service technician to connect to the server through the PC if the need arose. There would be such a need if the provided IP connection became disabled for any reason. The USB port would then provide an additional point of entry from which trouble-shooting data could be derived.) The HTTP functionality is useful for control purposes and to serve up Web pages for viewing battery voltage logs. In the preferred embodiment, only deteriorated voltage measurements are logged, as noted above.

In further detail, BVAS 106 monitors condition of the battery by using conventional voltage comparison device 202 which can be fabricated from hardware chip(s) or discrete components. Voltage comparator 202 can provide a binary state output of "1" for a "no battery" condition or a negative voltage condition (battery polarity backwards). Voltage Comparator 202 can provide a binary state of "0" for the presence of a voltage indicating a battery with proper polarity. These outputs are stored in memory 210 and serve as input to a process in server 203, which provides necessary processing to permit emailing, text messaging, and contacting PDA's and pagers with notifications of for example, a "no battery" condition.

Other, similar logic is employed to generate appropriate alert signals for a "marginal" condition where the battery voltage is less than fully charged but above a working threshold value, and for a "bad" condition where the battery voltage has deteriorated to less than that threshold value. For example, if twelve volts is considered to be the "fully charged" condition for the battery, the marginal condition can exist for any battery voltage less than twelve volts but greater than, for example, eight volts. In that case, the "bad" condition shall exist for any battery voltage of eight volts or less. Thus the preferred voltage comparator 202 includes the capability to detect, measure and indicate (in digital form) voltages over the range of the battery being monitored (in this example, zero volts to twelve volts).

A software implementation for providing notification messaging, for example, could be based on a methodology capable of receiving measurements from voltage comparator 202 and storing the measurements in memory 210, parsing the measurements generated by voltage comparator 202 and stored in memory 210, and finding stored battery measurement values and then using the values in accordance with the flowchart logic of FIG. 3, to be discussed below. The software could also create the actual messages that are e-mailed, text messaged, or paged to various devices for notification. Linux server 203 would then be able to send the proper notification, for example, to a service that would then send the message to a pager, PDA, or any text messaging device. Additional functionality may include the ability to send the message to a facility that provides for email relay to any accounts needing the information. The particular software used is not as important as ensuring the software's ability to perform the functionality described herein. As an example, standard compiled software and/or interpreted shell scripts may be used in connection with server 203 to implement software to implement the functionality described above.

Figure 3:
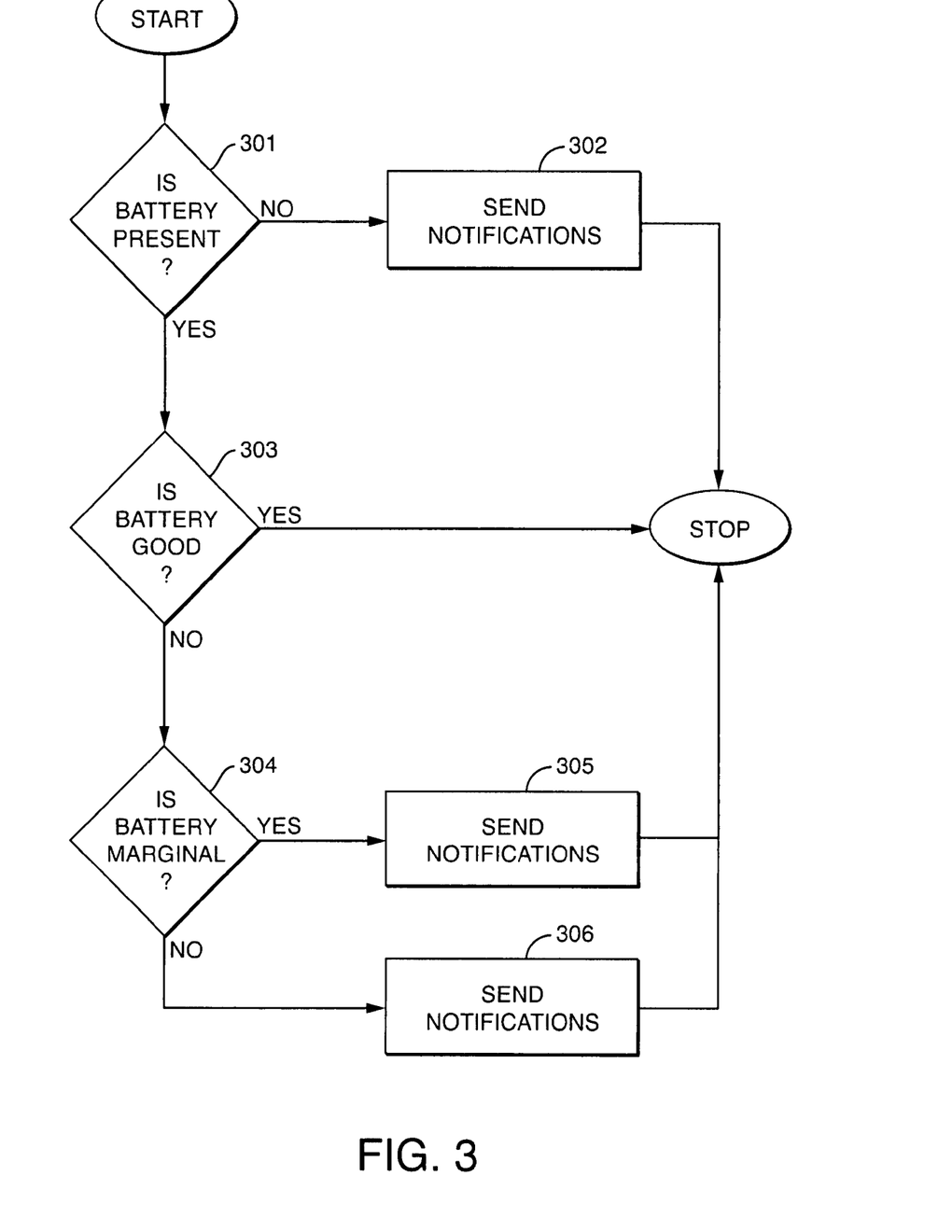
FIG. 3 is a flowchart of operation of an embodiment of the present invention.

FIG. 3 is a flowchart of operation of an embodiment of the present invention. The process starts with voltage comparator 202 making a measurement of the battery and generating an appropriate indication, which will be detected by the software of server 203 and stored in memory 210 for use in the notification process. As noted above, this indication may include state information (no battery detected, battery detected OK, battery marginal, battery bad) and/or actual voltage measurements in digital form. Measurement by voltage comparator may be continuous, periodic (e.g., once per day) or on the occurrence of an event (e.g., a button press). Detection and storage by the software of server 203 may likewise be performed on a periodic basis (e.g., once per day) or based on the occurrence of an event (e.g., button press).

Decision block 301 queries: is battery 201 present? if there is no battery in place the reading will be zero volts. If the polarity of battery 201 is reversed by mistake, that is essentially equivalent to no battery present, but will give a negative voltage reading. If for either of these two conditions the answer is "no" (which may be indicated by an appropriate measurement stored in memory 210), "send notifications" block 302 is executed by server 203 which sends appropriate email, paging, telephone call, etc. notifications to the relevant customer over the network 206 by way of the server operation discussed above. A typical notification could include the customer's email address, the battery condition that triggered the alarm, the time and date of the alarm, and a message advising the customer to contact its ONT supplier if it starts to receive additional notifications on a repetitive or continuous basis. If these notifications are frequent, the ONT supplier could then have its service personnel come to the customer's premises to physically check the battery and to replace it as may be required.

On the other hand, if the answer to the query in decision block 301 is "yes" then a battery does exist and it had been installed into ONT BBU properly to allow the correct polarity. According to the algorithmic process depicted, another inquiry is required and is made in decision block 303; Is battery 201 good? The battery is checked for proper status/voltage and if it has been recorded as in good condition (e.g., the absence of any recorded measurements over a certain time period), then the battery is rated "good." A good battery is the norm and no action need be taken.

However, if the answer to the query made in decision block 303 is "no", then the battery is not good and the degree of deterioration of the battery may be determined. The algorithmic process moves to decision block 304 wherein the query is made: Is battery 201 "marginal?" Server 203 may compare the recorded battery measurements to determine if the battery's voltage falls within the "marginal" range. In accordance with the example provided above, a twelve volt battery is good, and any reading between less than twelve volts and greater than eight volts is considered to be "marginal." If the battery voltage output, at the time of this query is, for example, ten volts, then the battery output voltage falls into the marginal category. The answer to the question in decision block 304 would then be "yes." Accordingly, notifications would be sent by "send notifications" block 305 which, again, would be one or all of email, telephone call, fax, text message, etc. made to the customer associated with the ONT for which this battery is the backup battery.

On the other hand, if the output voltage from the battery is eight volts or less, then the answer to the query in block 304 is "no." This means the battery falls into the "bad" category and shall fail very soon; this becomes an urgent matter and notifications are sent by "send notifications" block 306. In this case, notifications may be sent not only to a customer but also to the telecommunications company supplier of the customer's ONT and/or a battery service provider.

Where the process of FIG. 3 is performed upon the occurrence of event, once notifications are sent (or it has been determined that no notifications need to be sent), the process may end. Alternatively, where the process of FIG. 3 is performed periodically (e.g., once per day), the process can be repeated indefinitely. Thus, in the case where a battery is failing (or has already failed, including a missing battery or polarity problem), notifications may be sent periodically until the problem is rectified.

Referring back to FIG. 1, it can be seen that ONT power supply 104 powers BVAS 106 via power line 112. Thus, when utility company power is available, it powers BVAS 106. However, if power from the utility company is interrupted, the battery in ONT BBU 105 functions as substitute power for ONT unit 102. Its battery voltage output deteriorates as a result. Since ONT BBU 105 also backup-powers BVAS 106 via line 115, voltage requirements for operating BVAS 106 must be designed small enough to operate under conditions of deteriorating voltage level from battery 201. For example, in a particular embodiment, BVAS 106 is designed to operate with a five volt supply so that it can continue to operate until voltage deteriorates from twelve volts down to five volts, well-into the "bad" battery voltage zone, to allow "bad" notifications to be forwarded to the customer and to the ONT supplier, before it also shuts down from lack of power.

On the other hand, if there is a battery cell failure, without a utility company power failure, the battery voltage will drop accordingly even though the battery is subjected to a charging voltage. In this case, even if the battery voltage dropped below five volts due to multiple cell failure, BVAS 106 would continue to operate because it is being powered by ONT power supply 104, deriving its power from the utility company, and not from the battery.

Server 203 (FIG. 2) described above, is located within BVAS 106 in customer premises 101 (FIG. 1). Server 203 can store information about its associated battery's condition within its customer premises environment and is charged with the responsibility of sending low battery voltage alert notifications to its associated customer/subscriber.

In an alternative embodiment, this server functionality can be moved outside of the customer premises. For example, it can be moved to a centralized location that is in communication with, but remotely located from, multiple customer premises—such as the central office of the telecommunications company which had supplied the ONT unit to the customer. This outside location of the server offers several advantages including the capability of continuously monitoring not only this battery's voltage, but the voltage of each battery deployed in each one of the customer premises under control of this particular central office, as described in further detail below.

Figure 4:
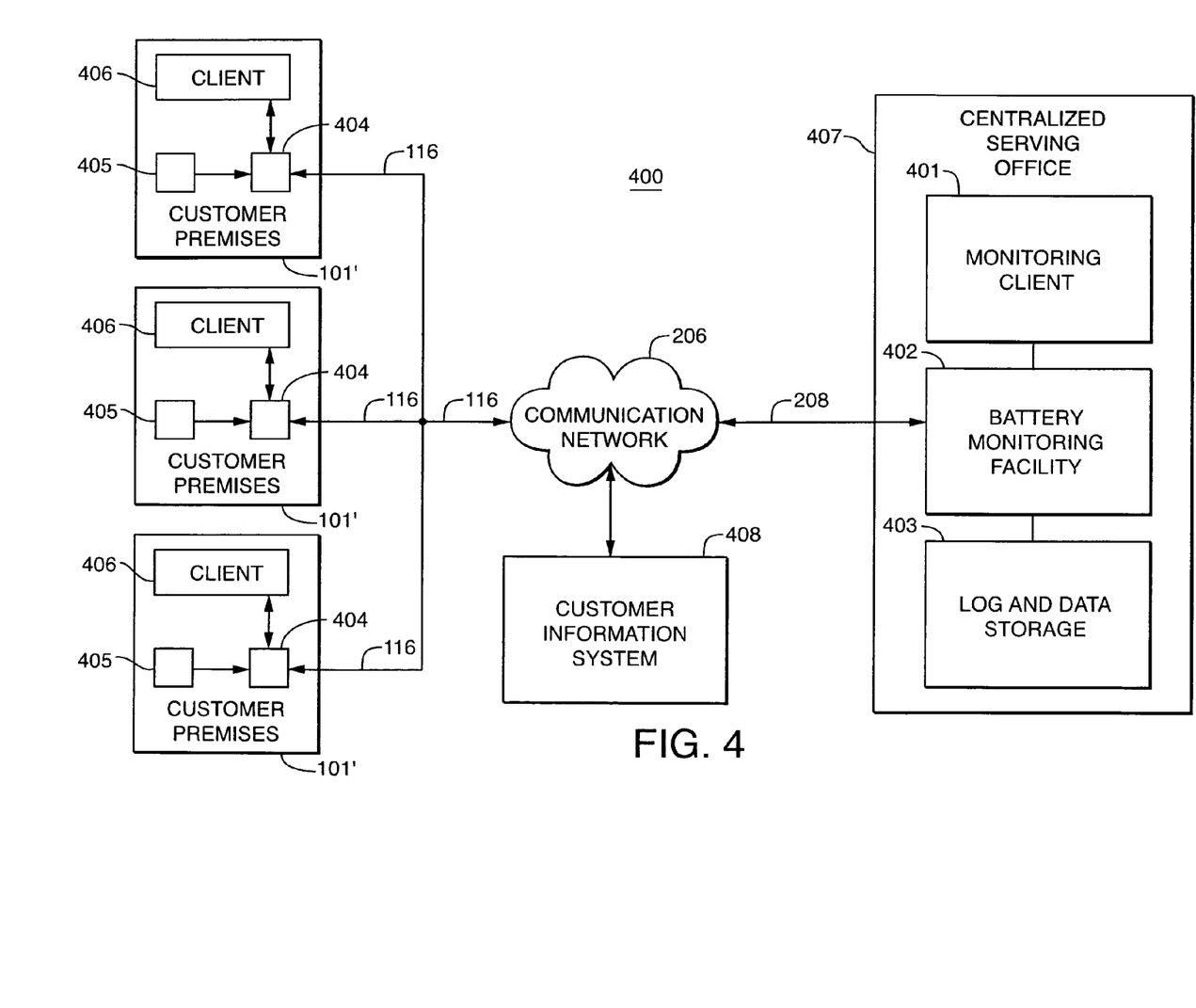
FIG. 4 is a diagram of a network configuration of an exemplary embodiment of the present invention.

Referring to FIG. 4, a diagram of a network configuration 400 of an exemplary embodiment of the present invention is depicted. In the right-hand side of the drawing, centralized serving office 407 of a service provider is shown containing battery monitoring facility 402. Battery monitoring facility 402 may be implemented using well known computing equipment and may be connected via network link 208 to communication network 206, the same link and network described above, where link 208, in this instance, is bi-directional. Also shown is a monitoring client 401 and log and data storage functionality 403 which are communicatively coupled to battery monitoring facility 402 (and in some embodiments either or both client 401 and functionality 403 may be co-located with battery monitoring facility 402 in centralized serving office 407). As will be described further below, battery monitoring system 402 can write to, and read from, log and data storage functionality 403, and can provide information to monitoring client 401, according to the processes described herein.

Although only one centralized serving office 407 is shown in FIG. 4, it is to be understood that multiple centralized serving offices 407 may be connected to communications network 206 (each serving a different plurality of customer premises via communication network 206). In such cases, a single monitoring client 401, a single battery monitoring facility 402 and a single log and data storage functionality 403, all located internal to, or external from, one of the multiple centralized serving offices, may be employed with all of the multiple centralized serving offices 407. In other words, in a particular configuration, client 401, battery monitoring facility 402 and log & data storage 403 may be co-located at a location within one of, or away from each of, the multiplicity of centralized serving offices which collectively serve a region of the service provider's customer premises, and may be employed with the entire multiplicity of offices. A geographical region can be a sub-state region of the United States (U.S.), an entire state of the U.S., or a multi-state region of the U.S. such as the northeast. Alternatively, each one of a number of sets of monitoring clients 401, battery monitoring systems 402 and log and data storage facilities 403 may be employed internal to, or external from, a like number, or a different number, of centralized serving offices, respectively, on a case-by-case basis.

On the left-hand side of the drawing, three individual customer premises each labeled 101' are shown, and it is to be understood that a possibility of many more customer premises similarly connected into network 400 of FIG. 4 is intended by this simplified depiction. Customer premises 101' are similar to customer premises 101 which are shown in FIG. 1 but, depending on the embodiment, customer premises 101' may or may not include BVAS 106 and/or its server 203. Furthermore, customer premises 101' do include new transceiver 404 functionality and new battery voltage packetizing functionality 405 as shown in FIG. 4. In addition, customer premises 101' explicitly shows client 406 which was not shown in customer premises 101.

In the center of the drawing, communication network cloud 206 is depicted interconnecting centralized serving office 407 via link 208 with customer premises 101' via network link(s) 116. In a particular embodiment, network cloud 206 can be the Internet. Client 406 requests notification service from battery monitoring facility 402 by way of network cloud 206. Also attached to network cloud 206 is customer information system 408, under control of a telecommunications company, or service provider, which can store customer data for various purposes such as allowing updates to customer preferences, etc.

Figure 5:
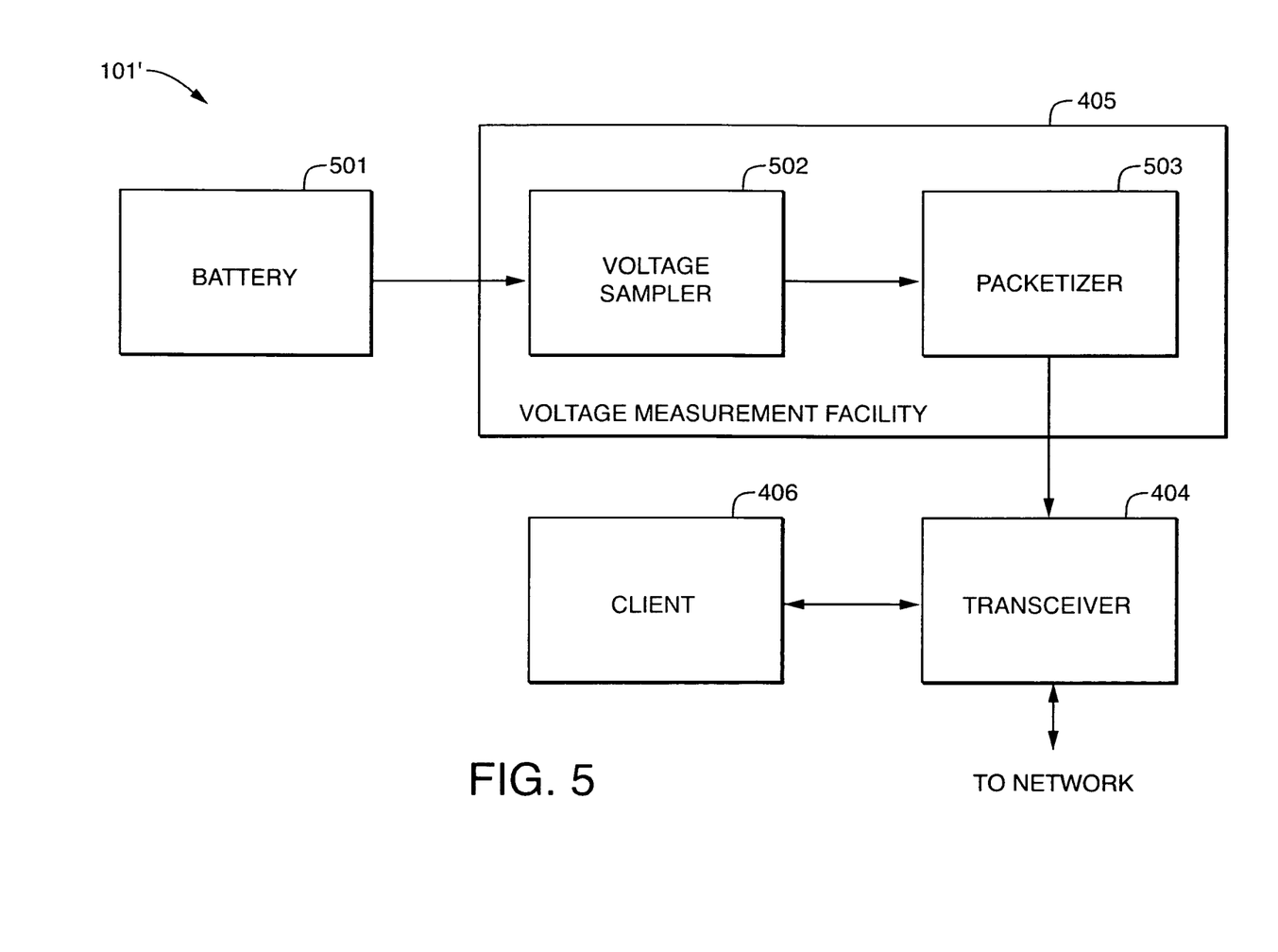
FIG. 5 is an exemplary block diagram showing additional detail of customer premises of FIG. 4.

FIG. 5 is a block diagram showing additional detail of customer premises 101' of FIG. 4. Voltage measurement facility 405 includes voltage sampler 502 and packetizer functionality 503. The voltage of battery 501 is sampled by voltage sampler 502 in a conventional way. Analog battery voltage is converted to sampled digital values by voltage sampler 502. Those digital values are packetized by packetizer 503, to ready that information for transmission over the network. Transceiver 404 takes those packet and transmits them over the network 206. Client 406 is in communication with the network via transceiver 404, as described herein.

In operation, voltage sampler 502 monitors the voltage of battery 501 (or 201 of FIG. 2) and samples that voltage at an appropriate frequency. Each of those sampling measurements may be converted into a binary number in a conventional manner and, by operation of packetizer 503, may be included in an individual packet. Packetizing functionality 503 also constrains the manner by which the data is transported from the customer's location through network cloud 206 and into battery monitoring facility 402. For example, this can be done over an encrypted link, such as, e.g., Secure Shell (SSH) with Internet Protocol Security (IPSec) and a Virtual Private Network (VPN). The data would in this case conform to the SSH and IPsec formats. Each such packet may be transmitted by transceiver 404 over bidirectional links 116 via communication network 206 (e.g., Internet) and bidirectional network link 208 to battery monitoring facility 402 in centralized serving office 407. Battery monitoring facility 402 can store information corresponding to this packet in log and data storage 403. Over time, a large data base of battery voltage readings for each battery being monitored in this manner can be created for various purposes including the formation of a statistical basis for estimating when any particular battery may be approaching a failure mode. This early warning permits charging or changing the battery long before it fails. This permits tracking voltages on each deployed battery by the telecommunications company, providing valuable data from which the telecommunications service provider can make important technical/business decisions.

In addition to accumulating this trending information, if and when any particular data packet, or series of consecutive data packets, indicates that voltage of a particular battery is low, for whatever reason, or has abruptly failed, an alert may be sent immediately by battery monitoring facility 402 to the customer associated with that failed/failing battery. An alert packet is thus sent from battery monitoring facility 402 via communication network 206 directly to transceiver 404 located in the particular customer premises associated with the failing battery. Transceiver 404 receives that alert packet and forwards it to its client 406 which can, for example, display it as an email/text message for its customer, and/or present it as a fax message, and/or ring a telephone with a synthesized voice alert message, etc, thereby alerting the customer to the impending battery failure issue. This early warning also permits the service provider to change or charge the battery before a battery failure actually impacts that customer. (A dead battery would not impact the customer if the power company is not experiencing a power outage at the time of battery failure.)

Alternatively (or additionally), battery monitoring facility 402 can notify monitoring client 401 of the impending battery failure, and monitoring client 401 can be used to control the means by which an alert is communicated to the customer with the failing battery. Under different conditions, where there is no current or trending battery failure being observed, but where common information (e.g., about batteries of a particular type) should be broadcast, monitoring client 401 can request that battery monitoring facility 402 transmit that common message to an appropriate set of customers.

In further detail, network 400 can utilize SNMP, HTTP and IP to send messages to and from the system components. In addition, battery monitoring facility 402 can operate with Server Network Access System (SNAS) software, which can provide a listing of notification addresses, or provide access to an email database, of customers at the various customer premises located within the sendee area of the centralized serving office. The address listing or the email database can be added via, for example, a user interface provided by the SNAS software which can be located within the functionality of customer information system 408. Alternatively, the SNAS system can be located elsewhere but can have access to a customer database system, at least a portion of which can be located at customer information system 408. This will allow for auto filling of the customer data and can then provide ONT identification based on the ONT ID supplied by the logging process associated with the data logs discussed earlier. In some embodiments, the customer may be given access to SNAS (for example, through a "web" user interface exposed via communication network 206) in order to permit it to set up its contact information and additional contact email addresses, which would be stored in the customer database. The SNAS user interface may also allow the customer to choose the method or methods of alert, and the length/detail of message associated with a sent alert.

With reference to trending data, data can be graphed via the user interface, the graphing mechanism being obtained, for example, through the use of the well known Multi Router Traffic Grapher (MRTG) software package or the well known Paessler Router Traffic Grapher (PRTG) software package. In such cases, the MRTG and PRTG software can be modified and used for trending alarm events, for example, over time and/or network addresses and/or equipment types.

In addition to conducting the monitoring of battery voltage through remotely located battery monitoring facility 402, in a particular embodiment, client 406, located in the customer premises, can utilize a program that, employs the Linux-based operating system of the ONT to provide a platform from which to locally capture ongoing battery voltage measurements. These measurements can be recorded at the customer premises and an alert can be sent directly to the customer based on a measurement indicating a fault. Client 406 can take the input from the hardware device doing the battery voltage monitoring, e.g., voltage comparator 202, and translate that data into voltage points which can be stored in a local, database associated with client 406. In other words, within customer premises 101' analog voltage data can be converted into voltage data points which are stored in a database associated with ONT 102 at the customer premises.

These data points are also delivered to battery monitoring facility 402 for storage on log and data storage database 403. The method for transport between the ONT equipment and battery monitoring facility 402 may employ SNMPv2 and/or SNMPv3, HTTP, and Secure Shell (SSH 2) encapsulated within Internet Protocol Security (IPSec) virtual private network (VPN). These protocols can provide whatever security is needed by the network while allowing effective common transport functionality. In addition, firewalls can be used to prevent intrusions. Furthermore, in some embodiments, log and data storage device 403 may maintain the logs and data on a periodic basis, e.g., a two week basis, and at the conclusion of each such two week; period the data is pruned, also known as log roll-off.

This local monitoring can be performed in accordance with this embodiment, in addition to the performing of the remote monitoring by battery monitoring facility 402. There is no conflict between customer notifications under client 406 and monitoring client 401. They are configured to cooperate with each other where, for example, if the notifications from each client were identical then there is inherently no conflict and the first to arrive notification is effective. There can also be a separate communication between the clients to ensure that there is no conflict. On the other hand, if the notifications from each client are different, (e.g., email from client 401 and telephone call from client 406) then both such customer notifications can be made without one interfering with the other.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. For example, if a battery is missing, or inserted with wrong polarity, the monitoring of that condition can be conducted over a series of predetermined time intervals until that condition is rectified. For another example, there can be more categories of battery deterioration that are reported, rather than only "marginal" and "bad." In addition, any type of communication from client 406 to its customer is contemplated; for example, client 406 can use Short Message Service (SMS) which is a text message service that enables short messages of no more than about 140-160 characters to be sent to SMS-enabled devices, such as mobile cell phones. Thus, client 406 can alert its customer to impending battery issues via a text message to the customer's preferred SMS-enabled device. Accordingly, the specification and drawings are accordingly to be regarded in an illustrative rather than restrictive sense.

What is claimed is:

1. A low battery-voltage warning system comprising:
    a plurality of voltage monitoring devices, each device configured to monitor voltage of a different one of a like plurality of batteries used as back-up power supplies, each battery operatively coupled via a different one of a like plurality of power busses directly to a different one of a like plurality of optical network terminals (ONTs), to supply back-up power directly, and thereby bypass any power supplies ordinarily supplying power to said ONT's, each said ONT installed on a different one of a like plurality of customer premises, each of said customer premises including a local client operatively connected to its respective device, wherein the voltage monitoring devices provide an indication of degree of discharge of said batteries;
    a battery monitoring facility located remotely from each one of said customer premises and communicatively connected to said plurality of voltage monitoring devices over a network, wherein the battery monitoring facility receives said indication as input information, stores said input information in a database associated with said battery monitoring facility and processes said input information into output information suitable for immediate communication to said customer; and
    a remote client operatively connected with said battery monitoring facility;
        wherein said local client obtains ongoing battery voltage measurements of its respective battery and sends an alert notification directly to its respective customer based on said measurements indicating a battery fault; and
        wherein said remote client transmits said output information reflecting said battery fault as another alert notification to said respective customer where, if said alert notification and said another alert notification are identical in kind, the first to arrive notification is effective but if said alert notification and said another alert notification are different in kind, then both notifications are made.

2. The warning system of claim 1 wherein said communication is accomplished via one or more of the following: email; text messaging; land-line telephone call; wireless telephone call; paging alert and/or communication to a personal digital assistant (PDA) of said customer.

3. The warning system of claim 1 wherein said battery monitoring facility further processes said input information into output information suitable for immediate communication to a supplier of said ONT, thereby alerting said supplier to either replace said battery or notify said customer to replace said battery.

4. The warning system of claim 1 wherein said remote location is a centralized serving office of a telecommunications service provider.

5. The warning system of claim 1 wherein said input information stored in said database is trending data reflecting expected remaining usable battery voltage.

6. The warning system of claim 1 wherein said indication is packetized at said customer premises prior to sending said indication to said battery monitoring facility over the network.

7. The warning system of claim 1 wherein said remote location is other than a centralized serving office of a telecommunications service provider, and is strategically positioned to permit said battery monitoring facility to monitor batteries deployed throughout a geographical region including a sub-state region of the U.S., a state of the U.S. or a multi-state region of the U.S.

8. The warning system of claim 1 wherein said remote location is a particular one of a multiplicity of centralized serving offices of a telecommunications service provider, said particular office being strategically positioned to permit said battery monitoring facility to monitor batteries associated with said multiplicity of centralized serving offices deployed throughout a geographical region including a sub-state region of the U.S., a state of the U.S. or a multi-state region of the U.S.

9. The warning system of claim 1 wherein said network is in communication with a customer information system under control of a telecommunications company, said system storing customer data for various purposes such as allowing updates to customer preferences.

10. A battery monitoring system comprising:
a plurality of batteries deployed at a like plurality of customer premises, said plurality of batteries used to backup a like plurality of power supplies for powering a like plurality of optical terminals located on said customer premises, each of said batteries being associated with a different one of said power supplies used to power a different one of said optical terminals on a different one of said customer premises:
a battery monitoring facility located remotely from each of said customer premises and communicatively connected to each of said plurality of customer premises via a network;
each of said customer premises including a voltage measurement facility and a local client operatively connected to said voltage measurement facility, said voltage measurement facility configured to measure voltage of its respective battery and transmit said voltage measurement over the network in digital format in a packet to said battery monitoring facility and said voltage measurement facility further including a battery voltage alert system providing an alert to said battery monitoring facility, said alert including state information, for said each battery, selected from the group of state information consisting of no battery detected, battery polarity reversed, battery detected ok, battery good, battery marginal and battery bad;
a remote client operatively connected with said battery monitoring facility; and
wherein said battery monitoring facility maintains a database, storing said voltage measurement and said alert in said database, and alerting at least the customer of said customer premises associated with said voltage measurement with a first notification if said voltage measurement or said alert indicates that its associated battery has failed or is about to fail, wherein said local client sends a second notification directly to the customer where, if said first notification and said second notification are identical in kind, the first to arrive notification is effective but if said first notification and said second notification are different in kind then both notifications are made to the customer, and wherein said batteries are operatively coupled via power busses directly to their respective said optical terminals, thereby bypassing said power supplies ordinarily supplying power to said respective optical terminals.

11. The battery monitoring system of claim 10 wherein said remote location is a centralized serving office of a telecommunications service provider and said each of said premises falls within the geographic area serviced by said centralized serving office.

12. The battery monitoring system of claim 11, wherein the battery monitoring facility notifies said telecommunications service provider if said voltage measurement indicates that said associated battery has failed or is about to fail.

13. The warning system of claim 1 wherein said voltage measurement facility comprises:
a voltage sampler, the voltage sampler sampling said voltage of said respective battery to obtain voltage samples;
a packetizer which generates data packets for communication over the network, the packetizer generated packets containing said voltage samples.

14. The warning system of claim 13 further comprising:
a transceiver communicatively connected to the network and the packetizer, the transceiver transmitting said data packets to said battery monitoring facility over said network.

15. The warning system of claim 14 wherein said transceiver receives packets from said battery monitoring facility over said network, said packets containing information about said battery, said transceiver forwarding said information to a client located within said customer premises for providing suitable notification of said information to a customer of said telecommunications service provider.

16. The warning system of claim 15 wherein said client notifies said customer via one or more of the following: email; text messaging; SNS text messaging; land-line telephone call; wireless telephone call; paging alert and/or communication to a personal digital assistant (PDA) of said customer.

17. The warning system of claim 1 wherein said network is also communicatively coupled to a customer information system (CIS) under control of a telecommunications service provider, said CIS including a data storage facility for storing customer data for various purposes.

18. The warning system of claim 17 wherein said data storage facility in combination with said database maintain data obtained over a large population of said batteries to offer statistical insight to battery performance and failure as a function of many variables comprising battery manufacturer, battery model, battery chemistry and battery placement location at the customer premises.

19. The warning system of claim 16 wherein the telecommunications service provider follows-up said notification to said customer by changing or charging said battery as needed.

20. A method, comprising:
monitoring a plurality of batteries to obtain information on each of said batteries, each said battery associated with its respective local client, deployed as a backup voltage source for a different optical network terminal (ONT) and utilized by said ONT as said backup voltage source during failure of a primary source of voltage for said ONT;
establishing a battery monitoring facility located remotely from each said ONT and communicatively connected via a network to said each said ONT, said battery monitoring facility including an associated monitoring client and storage capacity for storing said information on said each of said batteries;
transmitting, via said network, said information on said each of said batteries to said battery monitoring facility, said information including state information on said each of said batteries, said state information selected from the group of state information consisting of no battery detected, battery polarity reversed, battery detected ok, battery good, battery marginal and battery bad;

transmitting, via said network and for said each said ONT, a first alert to a user of said ONT if said state information indicates no battery detected, battery polarity reversed, battery marginal or battery bad; and transmitting, directly from said local client to said user, a second alert if said first alert is transmitted;

wherein if said first alert and said second alert are identical in kind, the first to arrive alert is effective but, if said first alert and said second alert are different in kind, then both alerts are provided to said user.

21. The warning system of claim 1 wherein said indication includes state information, for said each battery, selected from the group of state information consisting of no battery detected, battery polarity reversed, battery detected ok, battery good, battery marginal and battery bad.

22. A method, comprising:

monitoring back-up batteries used for supplying back-up voltage to optical network terminals (ONT's) when primary voltage is unavailable said monitoring including monitoring voltage output of a plurality of said batteries both directly through local clients, each said client directly associated with a different one of said plurality, and remotely over a network by way of a remote battery monitoring facility including a remote client, said voltage output being monitored to determine status of said back-up voltage;

for each said ONT, transmitting, via said network from said remote client, a first alert to a user of said ONT if said status of said back-up voltage for said ONT warrants said first alert;

transmitting, directly from said local client to said user, a second alert if said first alert is transmitted;

wherein if said first alert and said second alert are identical in kind, the first to arrive alert is effective but, if said first alert and said second alert are different in kind, then both alerts are provided to said user.

\* \* \* \* \*